Sept. 12 1961
C. F. GREEN
2,999,933
RADIATION RESPONSIVE MEANS
Filed Nov. 29, 1939
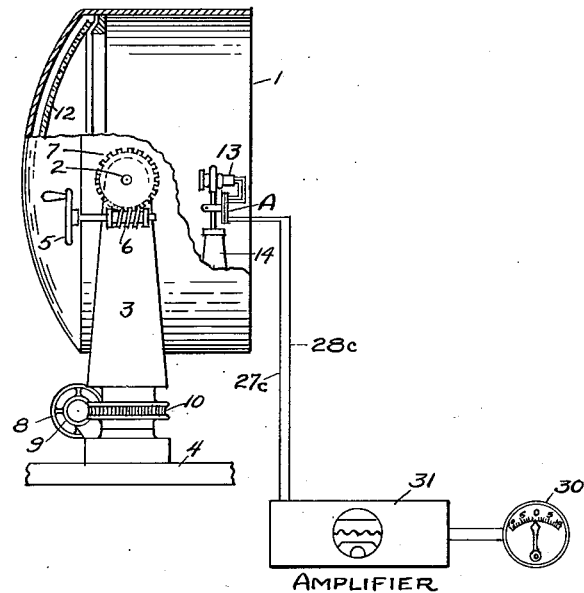
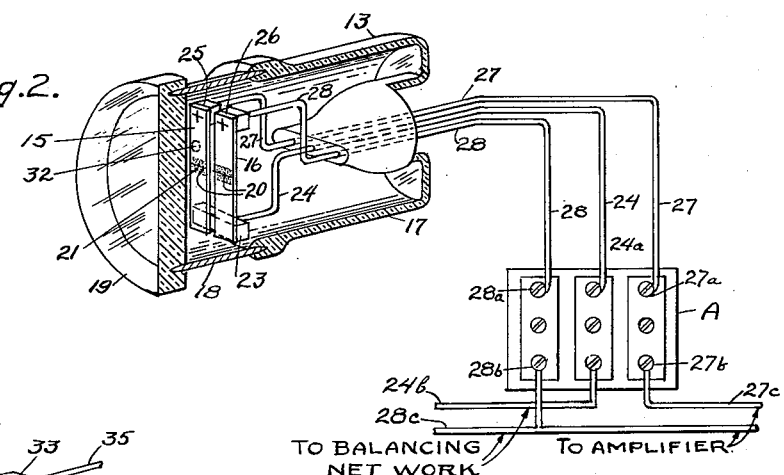
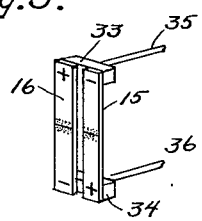
Inventor
Charles F. Green,
By Thomas H. Green
Attorney.

United States Patent Office 2,999,933
Patented Sept. 12, 1961

2,999,933
RADIATION RESPONSIVE MEANS
Charles F. Green, Schenectady, N.Y., assignor, by mesne assignments, to the United States of America as represented by the Secretary of War
Filed Nov. 29, 1939, Ser. No. 306,753
2 Claims. (Cl. 250—83.3)

This invention relates to apparatus for detecting distant objects by means of the thermal radiation from such objects and more particularly it is directed to a thermal-responsive detecting apparatus including an evacuated tube containing thermo-electric generating units by means of which distant invisible objects may be detected by their heat radiation.

Investigators in this particular field of research have experienced considerable difficulty in obtaining reliable indications with existing apparatus due to differences in the radiation received from different portions of the medium constituting the surrounding field or background of the object. For example, when searching the sky for an airplane which may be invisible, changes in radiation received from different portions of the sky and other changes in radiation such as those due to the effect of clouds have produced indications which have been confused with those due to the radiation from the object sought.

It is therefore one of the objects of this invention to provide an improved thermal-responsive detecting apparatus which avoids the difficulty mentioned by utilizing a radiation receiving means including an evacuated tube containing dual thermo-electric generating units which are associated within the tube in such a manner that while the receiving means will be effective to detect the object sought, the necessary compensation for variations in background radiation will be automatically made to render the indications of the apparatus independent of changes in background.

Another object of this invention is to provide a thermal-responsive detecting apparatus embodying an evacuated glass envelope having a rock-salt window and containing a pair of thermo-junctions, the elements of the junctions being interconnected within the tube so as to afford automatic compensation for background variations.

Another object of this invention is to provide a detecting apparatus having a thermo-couple vacuum tube arranged in the focal region of a reflector, the thermo-tube containing a pair of aligned thermo-junctions connected within the tube to oppose each other, the thermo-couple vacuum tube being mounted in the drum so that the focal point of the reflector passes through the junction line of one of the junctions within said tube.

With these and other objects in view, this invention consists in certain details of construction, combination and arrangement of parts to be more particularly hereinafter described and claimed.

Referring more particularly to the accompanying drawings in which like parts are designated by similar reference characters:

FIG. 1 is a side elevation partly in section of apparatus illustrating one embodiment of the instant invention;

FIG. 2 is a sectionalized perspective of the rock-salt window vacuum tube and illustrating the arrangement of the thermal-couple units therein, and FIG. 3 is a fragmentary detail of a modified form of the thermal-couple units and illustrating a modification in the electrical arrangement of said units.

In the illustrated embodiment characterizing this invention and with reference to FIG. 1, there is shown a drum 1 which is pivotally mounted at 2 on the arms of a yoke 3 for oscillation in a vertical plane. Yoke 3 is pivotally mounted on base 4 for oscillation in a horizontal plane. Suitable means are provided for moving the drum in each of the two planes whereby changes in elevation and azimuth are effected in the pointing of the drum. While such means may be either manual or power operated, the former is illustrated for the sake of simplicity; thus the handwheel 5 operates through the worm 6 and wormwheel 7 to move the drum in the vertical plane and the handwheel 8 operates through the worm 9 and wormwheel 10 to move the drum in the horizontal plane.

Within the drum is mounted the parabolic reflector 12 in the focal region of which is arranged the radiation responsive means contained within the envelope 13 which is supported from the drum by the pedestal 14. The radiation responsive means illustrated comprises the two similar thermo-junctions 15 and 16 which are mounted within and near one end of the evacuated envelope 13. This envelope is represented as comprising the glass portion 17 having the metallic end portion 18, which for example may be a silver sleeve, and the window or end plate 19 of a radiation transmitting material such as rock-salt. The sleeve has a thin tapering edge at both ends, the glass being fused over the inner end and the outer end being made vacuum tight with the window by a suitable seal such as silver chloride, which construction is described and claimed in the copending application of August, J. Kling, Serial No. 306,750, filed November 29, 1939, for Thermo-Couple Tube, now Patent No. 2,543,-369.

The two thermo-junctions comprise similar strips arranged adjacent and parallel to each other and each composed of two thermo-electrically dissimilar metals. These junction strips have been made by welding together thin plates of the desired materials at their edges and then rolling down the welded plates until they attain the desired thinness which is of the order of 6 to 10 millionths of an inch. Since the direction of the rolling has been transversely of the strip or in the direction of the junction line 20 the welded connection between the two metals is preserved even though the thickness of the resulting strip is reduced to only a few millionths of an inch. Various metals may be employed to form these thermo-junctions. Very successful results, however, have been obtained by employing for one element of the junction an alloy composed of nickel 44%, copper 55.5% and iron 0.5% commonly known as "Copnic," and for the other element an alloy composed of nickel 90% and chromium 10%, commonly known as "Chromel." Assuming that the apparatus is to be used for horizontal searching, that is, the drum and reflector are to be swung in azimuth at a given elevation, the two thermo-junction strips are arranged vertically as shown in FIG. 2. If the rate of heat transfer of one metal is the same as that of the other the junction line 20 will be arranged in the middle of each strip, otherwise the relative lengths of the two components of each strip will be proportioned to provide equal heat transfer to the two ends thereof. To increase the heating effect of the radiation at the vicinity of the junction lines a transverse black band may be painted or otherwise formed on each junction over the junction line as shown at 21.

The two similar thermo-junctions are connected to oppose each other. FIG. 2 shows, for example, the two negative ends of the junctions connected together by being secured to the bar 23 which is supported by the wire 24 and the two positive ends connected with the external circuit. These two ends are secured to the bars 25 and 26 which are supported by the wires 27 and 28 respectively, mounted in the stem of the envelope. The wires 24, 27 and 28 connect with 24a, 27a and 28a of terminal panel A. Terminals 27b—28b of this panel are connected via conductors 27c—28c with the input side of an amplifier 31, the output side of which is connected o a suitable indicator in the nature of milliammeter 30, is clearly shown in FIG. 1 of the drawing.

As pointed out above the two thermo-junctions are arranged in the focal region of the reflector, whereby an image of the field of observation, represented by the small dotted circle 32, is formed thereon, the two junctions being affected by different but adjacent portions of said field. With the above-described apparatus one is able to detect the presenec of an object in the field of view if the radiation received from the object is greater or less than that received from the remainder of the field or background for if the radiation image of the object falls on either junction strip the resulting change in temperature thereof will cause a deflection to be made by the indicator 30. If the image does not happen to fall on the junction line the operator by suitably changing the elevation of the drum may cause the image to fall directly on the junction line thereby giving a maximum reading. If the object is moving, for example an airplane, and the drum is held in a fixed position and directed toward a certain portion of the sky, an indication will be given when the image of the object passes one strip or the other. A similar effect will be produced if the drum is oscillated in a searching operation whereby the image of the object sought is caused to sweep past the one strip or the other.

As a result of the connection and arrangement of the thermo-junctions which has been shown and described above, whereby the two junctions are connected to oppose each other, compensation is atuomatically made for changes in the amount of radiation received from different portions of the sky or for changes in the amount of radiation received due to the effect of clouds or to other atmospheric conditions. Such changes in the background radiation affect both thermo-junctions equally for it will be seen that since the junctions are similar in construction and are similarly mounted, being exact duplicates, whereby the rate of heat transfer is the same for both and since they are connected to oppose each other the voltage due to background radiation of one neutralizes that of the other with the result that the indicator shows no deflection. A further result of the opposing arrangement of the two thermo-junctions is that the direction of the deflection of the indicator shows which of the two junctions is affected by the image of the object being sought. Preferably the thermo-junctions are so mounted in the drum that the focal point of the reflector and hence the axis thereof, passes through the junction line 20 of one junction which junction will be used for the detection of radiating bodies while the other will serve to compensate for changes in background radiation. By means of well known apparatus, not shown on the drawing, including a suitable dial controlled by the position of the drum, the operator may read off the position of the radiating body in azimuth and in elevation when the meter reading is maximum. If the position of the body is changing in azimuth or elevation the operator by the proper manipulation of the hand wheels 8 and 5 while watching the indicator may keep the drum trained on the body.

Obviously the envelope 13 containing the thermo-junctions may be mounted in the drum with the junction strips arranged horizontally instead of vertically as shown, in which case the drum would be adapted to be swung in elevation rather than in azimuth in searching for radiating bodies.

To correct for any small differences in resistance in the thermo-junction that may occur in manufacture, a suitable network (not shown) may be connected between the terminals 24a—28b via the conductors 24b—28c, as shown in FIG. 2 of the drawings, whereby the two junctions may have equal resistances when exposed to equal amounts of radiation so that the pointer of the indicator will stand at zero.

In FIG. 2 the two thermo-junctions are shown connected in series with the external circuit. In the modified form illustrated by FIG. 3 the two junctions are shown connected together in parallel with the external circuit, the positive end of one junction being connected with the negative end of the other junction through the bars 33 and 34. The junctions are supported in the envelope and connected with the external circuit by the two wires 35 and 36 which correspond to wires 27—28 of FIG. 2.

In conclusion it will be apparent the instant invention provides a detecting apparatus which not only affords dependable indications without regard to background variations, but also, owing to the manner of interconnecting the junction strips within the tube, will materially increase the sensitivity of the apparatus.

Having described my invention, what I claim as new and wish to secure by Letters Patent is:

1. A detector comprising a high vacuum thermo-couple tube including a window transparent to thermal radiation, a pair of coplanar thermo-electric generating units arranged in side-by-side relation within said tube, the plane of said units being immediately to the rear of and parallel with the window of said tube, each unit being composed of a pair of vertically disposed narrow flat strips of electrically dissimilar conductors of an order of thinness within the range of 6 to 10 millionths of an inch, the strips of each unit being united to each other along a horizontally disposed junction line arranged intermediate of the strips and being coextensive with their widths, the junction lines of one pair of strips forming a continuation of the other pair of said strips, the respective units being electrically connected in opposition within said tube for automatically compensating for changes in background radiation.

2. An apparatus for detecting distant bodies by thermal radiation comprising means for collecting and bringing to a focus the thermal emanations from a distant body, means adjacent said focus for translating thermal to electrical energy and an electro-responsive indicating device in electrical relation with said last-mentioned means, said last-mentioned means comprising a highly evacuated tube provided with a window transparent to thermal radiation, a pair of coplanar thermo-electric generating units arranged in side-by-side relation within said tube, the plane of said units being immediately to the rear of and parallel with the window of said tube, each unit being composed of a pair of vertically disposed narrow flat strips of electrically dissimilar conductors of an order of thinness within the range of 6 to 10 millionths of an inch, the strips of each unit being united to each other along a horizontally disposed junction line arranged intermediate of the strips and being coextensive with their widths, the junction lines of one pair of strips forming a continuation of the other pair of said strips, the respective units being electrically connected in opposition within said tube for automatically compensating for changes in background radiation.

References Cited in the file of this patent

UNITED STATES PATENTS

| | | |
|---|---|---|
| 1,343,393 | Hoffman | June 15, 1920 |
| 1,553,789 | Moeller | Sept. 15, 1925 |
| 1,963,185 | Wilson | June 19, 1934 |
| 1,971,317 | Sheldon | Aug. 21, 1934 |
| 2,015,675 | Hays | Oct. 1, 1935 |
| 2,125,113 | Kling | July 26, 1938 |
| 2,144,519 | Wilson | Jan. 17, 1939 |
| 2,392,873 | Zahl | Jan. 15, 1946 |